United States Patent [19]

Moyer et al.

[11] 4,144,950
[45] Mar. 20, 1979

[54] TURBINE BEARING LUBRICATION SYSTEM

[75] Inventors: Thomas D. Moyer, Toledo; Raymond Smith, Monclova, both of Ohio; Aldo J. Urbani, Lambertville, Mich.; Harley D. Greenburg, Monroe, Mich.; Glenn W. Hamburg, Grosse Pointe Park, Mich.; Francis X. Marsh, Maumee, Ohio; Robert S. Van Huysen, Temperance, Mich.

[73] Assignee: Teledyne Industries, Inc., Los Angeles, Calif.

[21] Appl. No.: 642,687

[22] Filed: Dec. 22, 1975

[51] Int. Cl.² .............................................. F16D 3/46
[52] U.S. Cl. ..................................... 184/6.11; 60/39.08
[58] Field of Search ................. 60/39.08; 184/6.18, 184/6.11, 6.16, 6, 31, 6.28, 11 R, 13 R; 308/187

[56] References Cited

U.S. PATENT DOCUMENTS

| 1,355,652 | 7/1917 | Coppus et al. | 184/6.11 |
| 1,953,068 | 4/1934 | Barker | 184/31 |
| 2,956,502 | 10/1960 | Glaser et al. | 184/6.11 |
| 3,074,688 | 1/1963 | De Muth et al. | 184/6.11 |
| 3,532,443 | 10/1970 | Johnson | 60/39.08 |
| 3,605,441 | 9/1971 | Hagemeister | 184/6.11 |
| 3,692,146 | 9/1972 | Butler | 184/6.11 |
| 3,757,535 | 9/1973 | Stein | 184/6.11 |
| 3,848,702 | 11/1974 | Bergman | 184/6.16 |
| 3,857,462 | 12/1974 | Kaufman et al. | 184/11 A |
| 3,890,780 | 6/1975 | Hagemeister | 184/6.11 |

FOREIGN PATENT DOCUMENTS

| 1207713 | 12/1965 | Fed. Rep. of Germany | 184/6.11 |
| 766531 | 1/1957 | United Kingdom | 184/6.11 |

Primary Examiner—Richard J. Johnson
Assistant Examiner—Lawrence E. Anderson
Attorney, Agent, or Firm—Gifford, Chandler, VanOphem, Sheridan & Sprinkle

[57] ABSTRACT

A bearing lubrication system for use in a gas turbine engine which utilizes empellers on the drive shaft to pump a lubricant into a lubricant transfer housing. At least one passageway is formed in the transfer housing which directs the lubricant from the pump to a bearing. The lubricant passes through the bearing and thereafter is returned to the pump for the beginning of a new lubrication cycle.

4 Claims, 4 Drawing Figures

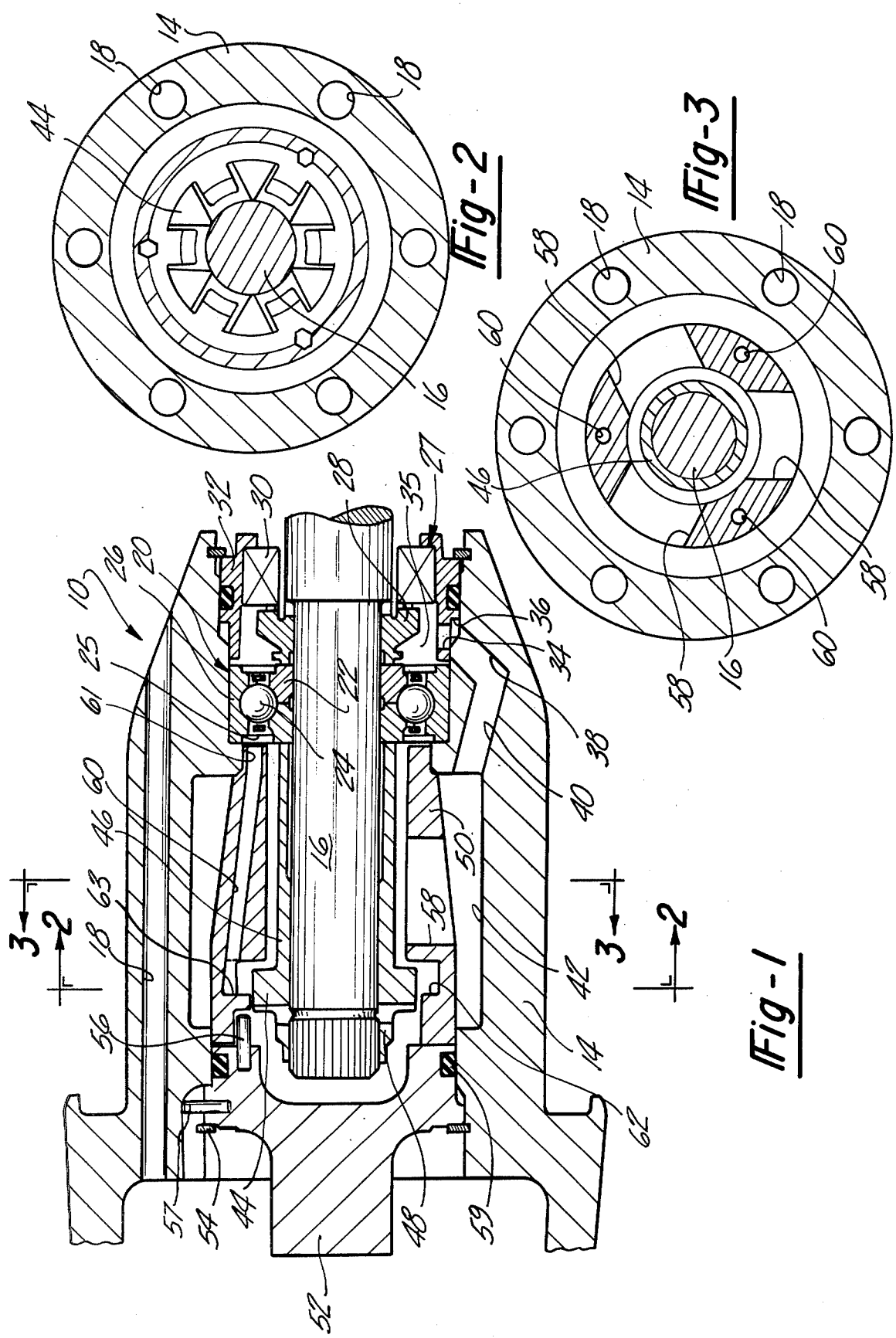

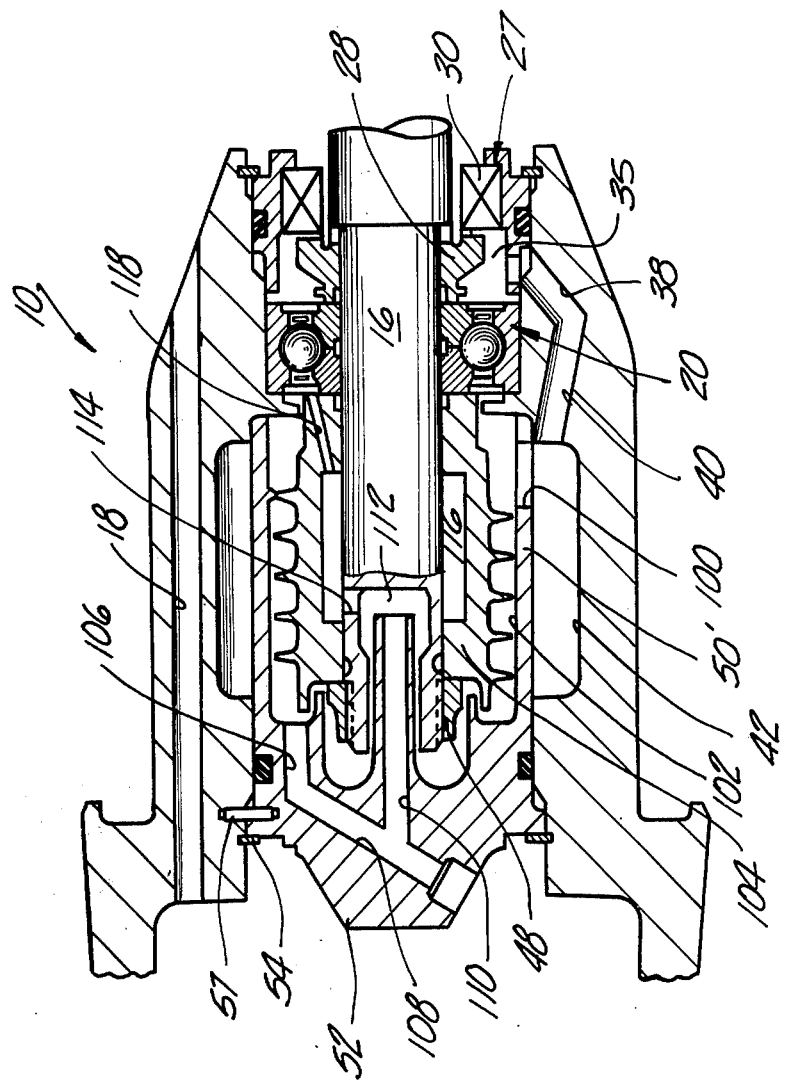

TURBINE BEARING LUBRICATION SYSTEM

BACKGROUND OF THE INVENTION

I. Field of the Invention

The present invention relates generally to lubrication systems and more particularly to a lubrication system for a gas turbine engine.

II. Description of the Prior Art

Gas turbine engines necessarily rotate at high speeds and consequently the bearings in the engine must be lubricated to prevent overheating and subsequent bearing failure. The previously known turbine engine lubrication systems, however, have been unduly complex and failure prone. Typically such previously known lubrication systems include oil pumps, external oil supply reservoirs, gear drive trains, oil lines, and the like. Thus the multiplicity of lubrication system components in the previously known systems not only greatly increased the cost of the lubrication systems, but also were failure prone since failure of any one of several components meant failure of the entire lubrication system. Failure of the lubrication system in a gas turbine engine often times causes the destruction of the entire engine. For this reason many previously known gas turbine engines included back up oil systems which, needless to say, increased the cost of the overall lubrication system.

SUMMARY OF THE INVENTION

The turbine engine lubrication system of the present invention eliminates the above mentioned disadvantages of the previously known lubrication systems by providing an impeller attached to the turbine drive shaft so that the impeller forces, either axially or centrifugally, a lubricant, typically oil, into a lubricant transfer housing as the turbine drive shaft rotates. This eliminates the necessity of a separately driven lubrication pump and the drive gear trains necessary with such pumps. A plurality of axial passageways are provided in the transfer housing which direct the lubricant received from the impeller to a bearing between the turbine drive shaft and the main support housing. The lubricant from the transfer housing flows through the bearing and is collected in a reservoir formed in the housing. The impeller then pumps the lubricant from the reservoir into the transfer housing and the above described lubrication cycle is repeated.

Besides the elimination of the previously known expensive and failure prone oil pump and gear drive trains, the lubrication system of the present invention enjoys the additional advantage that it is compact and may be totally contained within a turbine engine. More importantly, however, is that no component of the lubrication system is exposed to excessive wear and tear, unlike the previously known lubrication systems, so that the lubrication system of the present invention is virtually failure free for the life of the gas turbine engine.

BRIEF DESCRIPTION OF THE DRAWINGS

The present invention will be more clearly understood by reference to the following detailed description when read in conjunction with the accompanying drawings wherein like reference characters refer to like parts throughout the several views and in which:

FIG. 1 is a cross-sectional side view showing the self-contained bearing lubrication system of the present invention;

FIG. 2 is a cross-sectional view taken generally along line 2—2 of FIG. 1;

FIG. 3 is a cross-sectional view taken generally along line 3—3 in FIG. 1; and

FIG. 4 is a view similar to FIG. 1 but showing a modification thereof.

DETAILED DESCRIPTION

Referring particularly to FIG. 1 the lubrication system 10 of the present invention is shown there contained totally within an inner diameter of a compressor rotor of a gas turbine engine. A support housing 14 is provided and has a drive shaft 16 rotatably mounted therein. A plurality of through holes 18 extend axially through the support housing 14 so that air flow through the through holes 18 cools the housing 14.

The shaft 16 is rotatably mounted within the support housing 14 by a ball bearing assembly 20. The ball bearing assembly 20 comprises an inner race 22 which is secured to the shaft 16, balls 24, a ball separator 25, and an outer race 26 which is secured to the support housing 14. It is the ball bearing assembly 20 which the lubrication system 10 of the present invention is designed to lubricate. It should be understood, however, that the particular ball bearing assembly 20 is illustrated only by way of example and that other types of bearings, i.e. roller bearings, may be used without deviating from the scope of the present invention.

Still referring to FIG. 1, a sealing arrangement 27 comprising a mating ring 28, a seal 30 and a seal carrier 32 is axially spaced from the ball bearing assembly 20 and functions to prevent fluid flow outwardly of the compartment and along the shaft 16 toward the right as viewed in FIG. 1. Furthermore, the seal carrier 32 includes a plurality of radial apertures 34 along its periphery so that a lubricant may flow from a chamber 35 through the apertures 34 and into an annular chamber 36 formed by the junction of the seal carrier 32 with the support housing 14. Similarly a plurality of interconnecting passageways 38 and 40 in the support housing 14 provide fluid communication between the annular chamber 36 and a reservoir 42. The reservoir 42 is generally cylindrical in shape and is formed between the outer periphery of a generally cylindrical lubricant transfer housing 50 and the support housing 14.

An impeller 44 having a sleeve portion 46 is positioned on the shaft 16 forwardly or to the left in FIG. 1 of the ball bearing assembly 20 and is secured to the shaft 16 by a bearing nut 48.

A generally cylindrical lubricant transfer housing 50 is disposed within the support housing 14 between the bearing assembly 20 and an end enclosure 52 so that the shaft 16 and transfer housing 50 are coaxial. The end enclosure 52 is positioned within the support housing 14 by a retainer 54 and engages the oil transfer housing 50 by a pin 56 so as to index and prevent rotation of the transfer housing 50 relative to the support housing 14. A second pin 57 indexes the end enclosure 52 within the support housing 14. The end enclosure 52 also includes sealing means 59, such as an O-ring, between the end enclosure 52 and support housing 14.

The lubricant transfer housing 50 preferably includes three radial channels 58 (FIG. 3) therethrough so as to permit fluid communication from the reservoir 42 to the impeller 44. The number of such channels 58, of course, could be varied. A plurality of axial passageways 60, best shown in FIG. 3, are also provided through the transfer housing 50. The axial passageways 60 are open at their rearward end or outlet 61 to the ball bearing assembly 20 so that fluid flow from the passageways 60 will flow between the inner face 22 and outer race 26 of the ball bearing assembly 20. The inlets 63 of the passageways 60 open to an annular groove 62 formed in the transfer housing 50. The annular groove 62 is positioned radially outwardly from the impeller 44.

The embodiment of the invention as shown in FIG. 1 operates as follows: The reservoir 42 initially contains a predetermined amount of lubricant which is typically oil. Due to the rearward sealing arrangement 27 and the forward sealing means 59 around the end enclosure 52, the total amount of oil within the lubrication system of the present invention remains fairly constant since leakage is minimized. As the shaft 16 rotates, the impeller 44 which is connected to the shaft 16 centrifugally forces the lubricant into the annular groove 62 in the transfer housing 50. The lubricant is subsequently forced through the axial passageways 60 in the transfer housing 50 and through the ball bearing assembly 20, thus providing lubrication to the ball bearing assembly 20. The lubricant having flowed through the bearing assembly 20 then flows into the chamber 35 and out through the radial apertures 34 in the seal carrier 32, into the annular chamber 36, and finally out through interconnecting passageways 38 and 40 in the support housing 14 where the lubricant is finally returned to the reservoir 42. The lubrication cycle is then repeated.

The outer race 26 and the shaft 16 conduct a portion of the heat away from the bearing assembly 20 to the support housing 14, and the remainder of the heat from the ball bearing assembly 20 is transferred to the lubricant as the lubricant flows through the bearing assembly 20. The lubricant in turn conducts heat to the support housing 14 and air flow through the through holes 18 subsequently cools the support housing 14.

A modification to the bearing lubrication system of the present invention is illustrated in FIG. 4. In the modification, the lubricant transfer housing 50' is integral with the end enclosure 52 and includes at least one radial aperture 100 to permit fluid communication from the reservoir 42 into a cylindrical chamber 102 defined by the lubricant transfer housing 50'. A screw type or axial impeller 104 is secured to the shaft 16 by the nut 48 and functions upon rotation to pump lubricant axially into a passageway 106 in the lubricant transfer housing 50'. From the passage 106, the lubricant is pumped through passageways 108 and 110 into a chamber 112 formed in the shaft 16. A plurality of radial bores 114 in the shaft 16 permit fluid communication from the chamber 112 into an annular chamber 116 formed between the impeller 104 and the shaft 16. Axial feed holes 118 are provided through the impeller 104 and permit fluid communication from the annular chamber 116 to the ball bearing assembly 20 in order to lubricate and cool the ball bearing assembly 20 as has been previously described. Then, as before, the lubricant is collected in the chamber 35 and returned to the reservoir 42 through the passageways 38 and 40.

Having described our invention, other modifications and alterations thereto will become apparent to those skilled in the art to which it pertains without deviating from the spirit of the invention as defined by the scope of the appended claims.

What is claimed is:

1. A self-contained lubrication system for a turbine engine, said engine having a support housing and a drive shaft rotatably mounted at a midpoint by a bearing assembly so that a free end of the drive shaft extends into a cavity formed in the interior of the support housing, said lubrication system comprising, an annular pump impeller secured to the drive shaft adjacent the free end of the drive shaft so that said impeller is axially spaced from the bearing assembly and is contained within the support housing cavity, an annular lubricant transfer housing secured within the interior of the support housing cavity coaxially around said drive shaft, said transfer housing being spaced radially inwardly from said support housing and spaced radially outwardly from said drive shaft, said transfer housing having a plurality of circumferentially spaced axial passages formed therethrough wherein a first end of each axial passage is open to a first axial end of said bearing assembly closest to said impeller and wherein a second end of each axial passage is open to an interior annular groove in said transfer housing, said annular groove being coaxial with and spaced radially outwardly from said impeller, said support housing having a plurality of circumferentially spaced fluid passages for fluidly connecting a second axial end of the bearing assembly most spaced from the impeller to said support housing cavity, said support housing cavity forming a lubricant reservoir, said transfer housing having a plurality of radial passages formed therethrough between said bearing assembly and said impeller for establishing fluid communication from said reservoir to said pump impeller, end enclosure means for fluid sealing said support housing cavity at the end adjacent the free end of the drive shaft, sealing means between said shaft and said support housing at a position axially spaced away from the second end of the bearing assembly, whereby said lubrication system is completely contained within said support housing between said end enclosure means and said sealing means, and whereby upon rotation of said drive shaft, said impeller pumps lubricant from said reservoir into said annular groove, through the transfer housing axial passages and through said bearing assembly from its first to its second axial end.

2. The invention as defined in claim 1 wherein said sealing means comprises a seal carrier attached to said support housing, a seal carried by said seal carrier, and a mating ring intermediate said bearing means and said seal, and wherein said seal carrier has at least one radial aperture therethrough, said radial aperture being in fluid communication with said reservoir via an interconnecting passage in said support housing for returning said lubricant to said reservoir after said lubricant passes through said bearing means.

3. The invention as defined in claim 1 and including at least one throughbore formed through said support housing so that air flow through said throughbore removes heat from the support housing by convection cooling.

4. The invention as defined in claim 1 and including means formed in said support housing for carrying heat away from said support housing.

* * * * *

UNITED STATES PATENT AND TRADEMARK OFFICE
CERTIFICATE OF CORRECTION

PATENT NO. : 4,144,950

DATED : March 20, 1979

INVENTOR(S) : Thomas D. Moyer, et al

It is certified that error appears in the above–identified patent and that said Letters Patent are hereby corrected as shown below:

Column 3, line 3, delete "face" and insert --race-- therefor.

Signed and Sealed this

Twenty-fifth Day of September 1979

[SEAL]

Attest:

LUTRELLE F. PARKER

Attesting Officer

Acting Commissioner of Patents and Trademarks